United States Patent [19]
Buehler et al.

[11] Patent Number: 6,048,942
[45] Date of Patent: *Apr. 11, 2000

[54] THERMOPLASTIC OLEFIN ARTICLES HAVING HIGH SURFACE GLOSS AND MAR RESISTANCE

[75] Inventors: Charles K. Buehler, Lansing; Stephen M. Dwyer, Okemos, both of Mich.; Douglas Mosier, Seoul, Rep. of Korea; Matthew L. Paschick, East Lansing, Mich.

[73] Assignee: Montell North America Inc., Wilmington, Del.

[*] Notice: This patent issued on a continued prosecution application filed under 37 CFR 1.53(d), and is subject to the twenty year patent term provisions of 35 U.S.C. 154(a)(2).

[21] Appl. No.: 08/912,169

[22] Filed: Aug. 15, 1997

Related U.S. Application Data

[63] Continuation-in-part of application No. 08/719,853, Sep. 30, 1996, abandoned.

[51] Int. Cl.[7] .............................. C08L 23/00; C08T 5/17; C08T 5/32
[52] U.S. Cl. ........................ 525/240; 524/241; 524/265
[58] Field of Search .................... 524/241, 265; 525/240

[56] References Cited

U.S. PATENT DOCUMENTS

| | | | |
|---|---|---|---|
| 4,461,872 | 7/1984 | Su | 525/240 |
| 4,604,324 | 8/1986 | Nahmias et al. | 428/349 |
| 4,774,292 | 9/1988 | Thiersault et al. | 525/240 |
| 4,874,666 | 10/1989 | Kubo et al. | 428/398 |
| 5,268,220 | 12/1993 | Tajima et al. | 428/220 |
| 5,331,047 | 7/1994 | Giacobbe | 525/88 |
| 5,358,792 | 10/1994 | Mehta et al. | 428/516 |
| 5,391,618 | 2/1995 | Yamamoto et al. | 525/88 |
| 5,397,843 | 3/1995 | Lakshmanan et al. | 525/240 |
| 5,476,898 | 12/1995 | Dos Santos | 524/548 |
| 5,541,260 | 7/1996 | Pelliconi et al. | 525/240 |
| 5,639,816 | 6/1997 | Yamaguchi et al. | 524/451 |
| 5,639,829 | 6/1997 | Yamaguchi et al. | 525/451 |
| 5,744,086 | 4/1998 | Hallam | 264/296 |

FOREIGN PATENT DOCUMENTS

| | | |
|---|---|---|
| 0039739 | 11/1981 | European Pat. Off. . |
| 0298375 | 1/1989 | European Pat. Off. . |
| 61-209243 | 9/1986 | Japan . |
| 2127520 | 5/1990 | Japan . |
| 03081765 | 4/1991 | Japan . |
| 04202506 | 7/1992 | Japan . |
| 7108027 | 4/1995 | Japan . |
| 9214784 | 9/1992 | WIPO . |
| 93/03095 | 2/1993 | WIPO . |

*Primary Examiner*—David W. Wu
*Assistant Examiner*—Tanya Zalukaeva

[57] ABSTRACT

A thermoplastic olefin composition useful for making molded articles with high surface gloss and mar resistance includes (1) about 10 to about 90 parts of a propylene homopolymer, copolymer, or terpolymer, (2) about 90 to about 10 parts of either an olefin polymer composition that contains a low molecular weight ethylene copolymer rubber; an elastomeric copolymer of ethylene and a $C_3$–$C_8$ α-olefin made with a metallocene catalyst, or a mixture of the two, and (3) about 0.1 to about 10 parts of a lubricant per hundred parts of (1) plus (2).

10 Claims, No Drawings

6,048,942

THERMOPLASTIC OLEFIN ARTICLES HAVING HIGH SURFACE GLOSS AND MAR RESISTANCE

This application is a continuation in part of application Ser. No. 08/719,853 filed Sep. 30, 1996 now abandoned.

FIELD OF THE INVENTION

This invention relates to a thermoplastic olefin composition used for making molded articles that have improved surface gloss and mar resistance.

BACKGROUND OF THE INVENTION

Thermoplastic olefin compositions (TPO's) are uncrosslinked blends of olefin polymers and polyolefin elastomers. TPOs have been widely used, e.g., in the automotive fascia industry, because of their processability, cost effectiveness, and properties such as good weatherability and ease of color change. A TPO composition is disclosed, for example, in U.S. Pat. No. 5,391,618. The TPO composition comprises a blend of a propylene polymer with a copolymer of ethylene and a 4–18 carbon alpha-olefin. The composition is used to make molded articles that exhibit improved impact resistance and an excellent balance between impact resistance and rigidity.

However, TPOs also suffer from shortcomings such as a low gloss surface that is easily scratched or otherwise marred.

SUMMARY OF THE INVENTION

The composition of this invention comprises, by weight, (A) about 10 to about 90 parts of a propylene polymer material selected from the group consisting of (1) a crystalline propylene homopolymer, (2) a crystalline random copolymer of propylene and ethylene or a 4–8 carbon α-olefin, provided that when the olefin is ethylene, the maximum polymerized ethylene content is about 10%, and when the olefin is a 4–8 carbon α-olefin, the maximum polymerized content thereof is about 20%, and (3) a crystalline random terpolymer of propylene and two different α-olefins selected from the group consisting of ethylene and 4–8 C α-olefins, provided that the maximum polymerized 4–8 C α-olefin content is about 20%, and when ethylene is one of the olefins, the maximum polymerized ethylene content is about 5%.

(B) about 90 to about 10 parts of an olefin polymer material selected from the group consisting of (1) an olefin polymer composition prepared by sequential polymerization in two or more stages comprising:
  (a) about 25% to about 50% of a crystalline propylene homopolymer with a solubility in xylene at room temperature of less than or equal to 4%, or a crystalline random copolymer of propylene with ethylene or a 4–8 carbon α-olefin having an ethylene or α-olefin content of about 0.5% to about 3%, and a solubility in xylene at room temperature of less than or equal to 8%, and
  (b) about 50% to about 75% of an amorphous copolymer of ethylene selected from the group consisting of
    (i) a copolymer of ethylene and a 4–8 carbon α-olefin wherein the α-olefin content is about 10% to about 20% and the solubility in xylene at room temperature is about 10% to about 40%,
    (ii) a copolymer of ethylene and a 3–8 carbon α-olefin wherein the α-olefin content is about 20% to about 60% and the solubility in xylene at room temperature is about 10% to about 95%, and
    (iii) mixtures thereof,
    wherein the intrinsic viscosity of the xylene soluble portion of (B)(1)(b) is equal to or less than 2.5;
(2) an elastomeric copolymer of ethylene and a $C_3$–$C_8$ α-olefin made with a metallocene catalyst, and
(3) a mixture of (1) and (2),
wherein (A) plus (B) equals 100 parts, and
(C) about 0.1 to about 10 parts of a lubricant per hundred parts of (A) plus (B).

Molded articles made from this composition have a glossy surface that is much more resistant to abrasion than typical thermoplastic olefins.

DETAILED DESCRIPTION OF THE INVENTION

Component (A) of the composition of this invention is a propylene polymer material selected from the group consisting of (1) a crystalline propylene homopolymer, (2) a crystalline random copolymer of propylene and ethylene or a 4–8 carbon α-olefin, provided that when the olefin is ethylene, the maximum polymerized ethylene content is about 10% by weight, preferably about 4% to about 9%, and when the olefin is a 4–8 carbon α-olefin, the maximum polymerized content thereof is about 20%, preferably about 16%, and (3) a crystalline random terpolymer of propylene and two different α-olefins selected from the group consisting of ethylene and 4–8 C α-olefins, provided that the maximum polymerized 4–8 C α-olefin content is about 20%, preferably about 16%, and when ethylene is one of the olefins, the maximum polymerized ethylene content is about 5%, preferably about 4%. A crystalline propylene homopolymer is preferred. When a copolymer is used, a crystalline random propylene/ethylene copolymer is preferred.

There is no particular limitation on the method for preparing this propylene polymer material. The polymer material can be prepared by homopolymerizing propylene or copolymerizing propylene and ethylene or a 4–8 carbon α-olefin, or propylene and two different α-olefins, in a single stage or multiple stage polymerization process such as slurry polymerization, gas phase polymerization, liquid-gas phase polymerization, solution polymerization, or a combination thereof, using a so-called Ziegler-Natta catalyst. A Ziegler-Natta catalyst is usually one comprising a solid transition metal component comprising titanium, particularly a catalyst consisting of a solid composition of titanium tetrachloride and/or trichloride that contains as essential components titanium, magnesium and a halogen, an electron donor compound, and an organoaluminum compound. Suitable catalysts are described in U.S. Pat. Nos. 4,107,414; 4,294,721; 4,636,486, and 5,221,651, the description of which is incorporated herein by reference.

Component (A) is present in an amount of about 10 to about 90 parts by weight, preferably 40 to 60 parts.

Component (B) of the composition of this invention is an olefin polymer material selected from the group consisting of (1) an olefin polymer composition prepared by sequential polymerization in two or more stages comprising (a) about 25% to about 50% by weight of a crystalline propylene homopolymer with a solubility in xylene at room temperature of less than or equal to 4%, or a crystalline random copolymer of propylene with ethylene or a 4–8 carbon α-olefin having an ethylene or alpha-olefin content of about 0.5% to about 3%, and a solubility in xylene at room temperature of less than or equal to 8%, and (b) about 50% to about 75% by weight of an amorphous copolymer of ethylene selected from the group consisting of (i) a copolymer of ethylene and a 4–8 carbon α-olefin wherein the alpha-olefin content is about 10% to about 20% by weight and the solubility in xylene at room temperature is about 10% to about 40%, (ii) a copolymer of ethylene and a 3–8 carbon α-olefin wherein the α-olefin content is about 20% to about 60% and the solubility in xylene at room temperature is about 10% to about 95%, and (iii) mixtures thereof, (2) an elastomeric copolymer of ethylene and a 3–8 carbon α-olefin made with a metallocene catalyst, and (3) a mixture of (1) and (2).

Component (B)(1)(a) is preferably a crystalline propylene homopolymer. Component (B)(1)(b) is a low molecular weight material, i.e., the intrinsic viscosity of the xylene soluble portion is equal to or less than 2.5, preferably equal to or less than 2.2.

Component (B) is present in an amount of about 90 to about 10 parts by weight, preferably about 40 to about 60 parts. The total amount of component (A) plus component (B) equals 100 parts.

Examples of 4–8 carbon α-olefins that can be used as the comonomer in (A) and (B)(1) include 1-butene; 3-methyl-1-butene; 1-pentene; 1-hexene; 3,4-dimethyl-1-butene; 1-octene; 1-heptene; 4-methyl-1-pentene; 3-methylhexene-1, and 4,4-dimethylpentene-1. One or more of the above alpha-olefins can be used as the comonomer.

The olefin polymer composition that is used as component (B)(1) is prepared by sequential polymerization in two or more stages using highly stereospecific Ziegler-Natta catalysts such as those described below. During the sequential polymerization in two or more stages, (a) forms during the first stage of polymerization, while (b) is formed during the subsequent polymerization stages(s) in the presence of (a) formed in the first stage. The polymerization can be conducted in liquid phase, gas phase, or liquid-gas phase using separate reactors, all of which can be carried out either by batch or continuously. For example, it is possible to carry out the polymerization of (a) using liquid propylene as a diluent, and the polymerization of (b) in the gas phase, without intermediate stages except for the partial degassing of the propylene. Gas phase polymerization is the preferred method.

The polymerization reactions are carried out in an inert atmosphere in the presence of an inert hydrocarbon solvent or of a liquid or gaseous monomer. Suitable inert hydrocarbon solvents include, for example, saturated hydrocarbons, such as propane, butane, hexane and heptane. Hydrogen can be added as needed as a chain transfer agent for control of molecular weight.

The reaction temperature used for the polymerization of (B)(1)(a) and for the polymerization of (B)(1)(b) can be the same or different, and is generally from 40° to 90° C., preferably 50° to 80° C. for the polymerization of (B)(1)(a), and 40° to 70° C. for the polymerization of (B)(1)(b).

The pressure of the polymerization of (B)(1)(a), if carried out in liquid monomer, is one that competes with the vapor pressure of the liquid propylene at the operating temperature used, eventually modified by the vapor pressure of the small quantity of inert diluent used to feed the catalyst mixture, and the overpressure of optional monomers and the hydrogen used as the molecular weight regulator.

The pressure of the polymerization of (B)(1)(a) if done in gas phase, can be from 5 to 30 atm. The residence time relative to the two stages depends on the desired ratio between (B)(1)(a) and (B)(1)(b), and is usually from 15 minutes to 8 hours.

The Ziegler-Natta catalyst that can be used in the polymerization of the olefin polymer composition comprises the reaction product of (1) a solid component containing a halogen-containing titanium compound and an electron donor compound supported on activated magnesium chloride, characterized in that they are capable of producing polypropylene with an isotactic index greater than or equal to 96%, preferably 99%, (2) a non-halogen containing Al-trialkyl compound and (3) an electron donor compound (external donor).

Suitable titanium compounds include those with at least one Ti-halogen bond, such as halides and alkoxy halides of titanium.

In order to obtain these olefin polymer compositions in the form of flowable spherical particles having a high bulk density, the solid catalyst component must have (a) a surface area smaller than 100 m$^2$/g, preferably between 50 and 80 m$^2$/g, (b) a porosity from 0.25 to 0.4 cc/g, and (c) an X-ray spectrum, where the magnesium chloride reflections appear, showing the presence of a halo between the angles 2θ of 33.5° and 35° and by the absence of the reflection at 2θ of 14.95°. The symbol θ=the Bragg angle, The solid catalyst component is prepared by forming an adduct of magnesium dichloride and an alcohol, such as ethanol, propanol, butanol and 2-ethylhexanol, containing generally 3 moles of alcohol per mole of MgCl$_2$, emulsifying the adduct, cooling the emulsion quickly to cause the adduct to solidify into spherical particles, and partially dealcoholating the particulate adduct by gradually increasing the temperature from 50° C. to 130° C. for a period of time sufficient to reduce the alcohol content from 3 moles to 1–1.5 moles per mole of MgCl$_2$. The partially dealcoholated adduct is then suspended in TiCl$_4$ at 0° C., such that the concentration of adduct to TiCl$_4$ is 40–50 g/l TiCl$_4$. The mixture is then heated to a temperature of 80° C. to 135° C. for a period of about 1–2 hr. When the temperature reaches 40° C., sufficient electron donor is added so that the desired molar ratio of Mg to electron donor is obtained.

An electron donor compound selected preferably among the alkyl, cycloalkyl, and aryl phthalates, such as for example diisobutyl, di-n-butyl, and di-n-octyl phthalate, is added to the TiCl$_4$.

When the heat treatment period has ended, the excess hot TiCl$_4$ is separated by filtration or sedimentation, and the treatment with TiCl$_4$ is repeated one or more times. The solid is then washed with a suitable inert hydrocarbon compound, such as hexane or heptane, and dried.

The solid catalyst component typically has the following characteristics:

| | |
|---|---|
| Surface area: | less than 100 m$^2$/g, preferably between 50 and 80 m$^2$/g |
| Porosity: | 0.25–0.4 cc/g |
| Pore volume distribution: | 50% of the pores have a radius greater than 100 Å |
| X-ray spectrum: | where the Mg chloride reflections appear, showing a halo with maximum intensity between angles of 2θ of 33.5° and 35°, and where the reflection at 2θ of 14.95° is absent. |

The catalyst is obtained by mixing the solid catalyst component with a trialkyl aluminum compound, preferably triethyl aluminum and triisobutyl aluminum, and an electron donor compound.

Various electron donor compounds are known in the art. The preferred electron donor compounds are those silane compounds having the formula R'R"Si(OR)$_2$ where R' and R" may be the same or different and are $C_{1-18}$ normal or branched alkyl, $C_{5-18}$ cycloalkyl, or $C_{6-18}$ aryl radicals, and R is a $C_{1-4}$ alkyl radical.

Typical silane compounds that can be used include diphenyldimethoxysilane, dicyclohexyldimethoxysilane, methyl-t-butyldimethoxysilane, diisopropyldimethoxysilane, dicyclopentyldimethoxysilane, cyclohexylmethyldimethoxysilane and phenyltrimethoxysilane.

The Al/Ti ratio is typically between 10 and 200 and the Al/silane molar ratio between 1/1 and 1/100.

The catalysts can be precontacted with small quantities of olefin monomer (prepolymerization), maintaining the catalyst in suspension in a hydrocarbon solvent and polymerizing at a temperature from room temperature to 60° C. for a time sufficient to produce a quantity of polymer from 0.5 to 3 times the weight of the catalyst.

This prepolymerization also can be done in liquid or gaseous monomer to produce, in this case, a quantity of polymer up to 1000 times the catalyst weight.

The amount of catalyst residue in the thermoplastic olefin polymers is sufficiently small so as to make the removal of catalyst residue, typically referred to as deashing, unnecessary.

Component (B)(2) is an elastomeric copolymer of ethylene and a $C_3$–$C_8$ alpha-olefin that was prepared using a metallocene catalyst. The elastomeric copolymers preferably have an ethylene content of 55% to 80%, most preferably 65% to 75%. The elastomeric copolymers are prepared as described, for example, in U.S. Pat. Nos. 5,001,205 and 5,491,207, the disclosures of which are incorporated herein by reference.

Component (B) can also be a mixture of (B)(1) and (B)(2).

Component (C) of the composition of this invention is a lubricant, which is defined as any agent known to reduce the surface coefficient of friction of molded articles made from the composition of this invention. One or more lubricants can be used. A polysiloxane is preferred for long term mar resistance. Suitable polysiloxanes include polymethylphenylsiloxane and polymethylalkylsiloxanes, where the alkyl group has 1–10 carbon atoms, e.g., polydimethylsiloxane. One or more additional lubricants, e.g., metal stearates such as potassium stearate; saturated fatty acid amides such as Kemamide S fatty acid amide and Kemamide B fatty acid amide, available from Humko Chemical Division, Witco Corporation, and unsaturated fatty acid amides such as Kemamide U, O, and E fatty acid amides, also available from Humko, can also be present. Of these additional lubricants, erucamide and oleamide lubricants are preferred. A combination of a polysiloxane, erucamide, and oleamide is most preferred. The lubricant is present in an amount of about 0.1 parts to about 10 parts by weight, preferably 0.2 to 0.6, per hundred parts of component (A) plus component (B).

If desired, a nucleating agent, i.e., any agent known to cause nucleation, can be added to the composition of this invention. One or more nucleating agents can be used. Suitable nucleating agents include, for example, sodium benzoate, talc, $TiO_2$, calcium stearate, p-aminobenzoic acid, and aluminum t-butyl benzoate. Sodium benzoate is preferred. If a nucleating agent is used, it is present in an amount of about 0.1 to about 10 parts by weight, preferably about 0.1 to about 1 part per hundred parts of component (A) plus component (B).

Other additives such as heat and/or ultraviolet light stabilizers, antioxidants, fillers, and coloring agents can also be present in the composition The composition of this invention can be prepared, for example, by melting and kneading the components in an apparatus such as a Brabender plastograph, a Banbury mixer, a kneader blender, or a twin screw extruder, and the resulting mixture is then preferably pelletized by known methods. The pellets can be molded or formed by various methods known in the art. The compositions of this invention are particularly suited for injection molding.

In the following examples the listed materials were blended in a 1500 ml Bolling 00 mixer, available from Stewart Bolling Inc. The components were blended until a homogeneous mixture was obtained, approximately three minutes. The mixture was then discharged at a mixing chamber temperature of 300°–330° F. The mixture was formed into a ¼ to ½ inch sheet using a two roll mill available from Reliable Rubber and Plastic and Machinery Co., Inc. The material was granulated in a Conair Wor-tec JC-5L granulator and injection molded into 4 inch×6 inch test specimens using a Van Dorn 120 ton injection molder available from Van Dorn Plastics Machinery Co. The injection molded specimens were conditioned by holding at 72° F. and 50% humidity for a minimum of 40 hours. The gloss and abrasion resistance of the test pieces were then evaluated.

All gloss readings were taken with a 60 degree gloss meter from a smooth (ungrained) sample. A gloss value of 70 or more was considered to be acceptable.

Abrasion resistance was measured using a mechanically driven scratch apparatus available from Ford-Werke AG, Koln, Germany, using Ford Laboratory Test Method BN 108-13 (resistance to scratching). The apparatus included several weighted pins that rested on the surface of the test specimen. The pins were loaded with different weights exerting the following standard forces on the surface of the test material: Stylus #1=7.0 Newtons (N); #2=6.0 N; #3=3.0 N; #4=2.0 N; #5=0.6 N. The pins were then pulled along the panel. All scratch lines were rated according to the following system. The area where the five pins were allowed to contact the surface of the panel was inspected. Of the pins that permanently marked the surface, the force of the pin that applied the least force was recorded. If the surface was not permanently marked by any pin, N/M was recorded. A test value of 6.0 N or higher was considered to be acceptable. A black test specimen was used because experience indicated that scratching was easier to see with the naked eye on a black surface than on surfaces of other colors.

Melt flow rate was measured according to ASTM method D 1238-89, Condition L (2.16 kg, 230° C.).

The percent xylene solubles at room temperature was determined by dissolving 2.5 g of the polymer in 250 ml of xylene in a vessel that was equipped with a stirrer and was heated to 135° C. with agitation for 30 minutes. The solution was cooled to 25° C. while continuing the agitation, and then left to stand without agitation for 30 minutes so that the solids could settle. The solids were filtered with filter paper, the remaining solution was evaporated by treating it with a nitrogen stream, and the solid residue was vacuum dried at 70° C. until constant weight was reached.

The intrinsic viscosity was measured in tetralin at 135° C. using a Cinevisco viscometer.

In this specification, all parts and percentages are by weight unless otherwise noted.

EXAMPLES AND COMPARATIVE EXAMPLES 1–12

The components listed in Table 1 (parts by weight) were mixed and formed into test specimens as described above. Examples 1 and 3 and Comparative Examples 2 and 4 demonstrate the increase in surface gloss when a low molecular weight rubber rather than a high molecular weight rubber is used in the thermoplastic olefin compositions of this invention. In these examples the % rubber remained constant at 34%, while the molecular weight and rubber type ($C_2C_3$ vs $C_2C_4$) were varied.

The use of an ethylene/propylene rubber rather than an ethylene/1-butene rubber did not appear to have any effect on the gloss level. Comparative Example 5 and Examples 6 to 12 demonstrate the increase in mar resistance when a lubricant is present in the composition.

Polymer E was an olefin polymer composition containing 51% by weight of an ethylene/propylene copolymer having a solubility in xylene at room temperature of 43.0%, of which 50% was ethylene. The IV of the xylene soluble portion was 1.8. The copolymer was dispersed in 49% by wt. of a propylene homopolymer matrix having a solubility in xylene at room temperature of 2.5%.

Polymer F was an olefin polymer composition containing 65% by weight of an ethylene/propylene copolymer having a solubility in xylene at room temperature of 53.8%, of which 50% was ethylene. The IV of the xylene soluble portion was 3.3. The copolymer was dispersed in 35% by wt. of a propylene homopolymer matrix having a solubility in xylene at room temperature of 2.5%.

Lubricant 1 was MB050-01 polysiloxane masterbatch, available from Dow Corning.

TABLE 1

| Example | 1 | Comp. 2 | 3 | Comp. 4 | Comp. 5 | 6 | 7 | 8 | 9 | 10 | 11 | 12 |
|---|---|---|---|---|---|---|---|---|---|---|---|---|
| Polymer A | 32 | 41.4 | 33.3 | 47.7 | 50 | 50 | 50 | 50 | 50 | 50 | 50 | 50 |
| Polymer B | | | | | 50 | 50 | 50 | 50 | 50 | 50 | 50 | 50 |
| Polymer C | 68 | | | | | | | | | | | |
| Polymer D | | 58.6 | | | | | | | | | | |
| Polymer E | | | 66.7 | | | | | | | | | |
| Polymer F | | | | 52.3 | | | | | | | | |
| Lubricant 1 | 2 | 2 | 2 | 2 | | | | 2 | 2 | 2 | 2 | |
| Lubricant 2 | 0.3 | 0.3 | 0.3 | 0.3 | | | 0.3 | 0.3 | | | 0.3 | 0.3 |
| Lubricant 3 | 0.3 | 0.3 | 0.3 | 0.3 | | 0.3 | 0.3 | 0.3 | | 0.3 | | |
| Antioxidant | 0.3 | 0.3 | 0.3 | 0.3 | 0.3 | 0.3 | 0.3 | 0.3 | 0.3 | 0.3 | 0.3 | 0.3 |
| Stabilizer 1 | 0.3 | 0.3 | 0.3 | 0.3 | 0.3 | 0.3 | 0.3 | 0.3 | 0.3 | 0.3 | 0.3 | 0.3 |
| Stabilizer 2 | 0.3 | 0.3 | 0.3 | 0.3 | 0.3 | 0.3 | 0.3 | 0.3 | 0.3 | 0.3 | 0.3 | 0.3 |
| Stabilizer 3 | 0.3 | 0.3 | 0.3 | 0.3 | 0.3 | 0.3 | 0.3 | 0.3 | 0.3 | 0.3 | 0.3 | 0.3 |
| Carbon Black | 4 | 4 | 4 | 4 | 4 | 4 | 4 | 4 | 4 | 4 | 4 | 4 |
| Properties | | | | | | | | | | | | |
| MFR, dg/min | 19.8 | 5.7 | 11.1 | 4.3 | 11.3 | 11 | 11.2 | 11.5 | 10.9 | 11.2 | 12.2 | 11.5 |
| Specific gravity, g/cc | 0.92 | 0.92 | 0.91 | 0.9 | 0.92 | 0.92 | 0.92 | 0.92 | 0.92 | 0.92 | 0.92 | 0.92 |
| Flexural Modulus, kpsi .05 in/min; tangent | 106 | 128 | 91 | 95 | 124 | 115 | 117 | 114 | 116 | 105 | 107 | 113 |
| Ford scratch test, N | N/M | 2.0 | 6.0 | 2.0 | 0.6 | N/M | N/M | N/M | 6.0 | N/M | 6.0 | N/M |
| Gloss, 60° Meter | 80 | 43 | 86 | 48 | 79 | 89 | 82 | 88.2 | 90 | 83 | 90 | 82 |

In the table, Polymer A was a crystalline propylene homopolymer having a melt flow rate (MFR) of 12 dg/min and a solubility in xylene at room temperature of 4%. Polymer A is commercially available from Montell USA Inc.

Polymer B was an olefin polymer composition containing 68% by weight of an ethylene/1-butene copolymer having a solubility in xylene at room temperature of 35%, of which 82% was ethylene, dispersed in 32% by wt. of a propylene homopolymer matrix having a solubility in xylene at room temperature of 2.3%. The intrinsic viscosity (IV) of the xylene soluble portion of the ethylene/1-butene copolymer was 1.8.

Polymer C was an olefin polymer composition containing 50% by weight of an ethylene/1-butene copolymer having a solubility in xylene at room temperature of 24.0% of which 84% was ethylene. The IV of the xylene soluble portion was 1.0. The copolymer was dispersed in 50% by wt. of a propylene homopolymer matrix having a solubility in xylene at room temperature of 2.5%.

Polymer D was an olefin polymer composition containing 58% by weight of an ethylene/1-butene copolymer having a solubility in xylene at room temperature of 24.2%, of which 83% was ethylene. The IV of the xylene soluble portion was 3.0. The copolymer was dispersed in 42% by wt. of a propylene homopolymer matrix having a solubility in xylene at room temperature of 2.5%.

Lubricant 2 was Kemamide E unsaturated fatty primary amide, which is derived from erucic acid and is available from Humko Chemical Division of Witco Corporation.

Lubricant 3 was Kemanmide U unsaturated fatty primary amide, which is derived from oleamide and is available from Humko Chemical Division of Witco Corporation.

The antioxidant was 2,2-bis[[3-[3,5-bis(1,1-dimethylethyl)-4-hydroxyphenyl]-1-oxopropoxy]-methyl]-1,3-propanediyl-3,5-bis( 1,1-dimethylethyl)-4-hydroxybenzene propanoate and tris(2,4-di-tert-butylphenyl) phosphite as a 50/50 blend (Irganox B225 antioxidant, available from CIBA Specialty Chemicals Corporation).

Stabilizer 1 was bis(2,2,6,6-tetramethyl-4-piperidinyl) sebacate.

Stabilizer 2 was 2-(2-hydroxy-3,5-di-tertiaryamylphenyl)-2H-benzotriazole.

Stabilizer 3 was N,N'-bis(2,2,6,6-tetramethyl-4-piperidinyl)-1,6-hexanediamine polymer with 2,4,6-trichloro-1,3,5-triazine and 2,4,4-trimethyl-1,2-pentanamine stabilizer, (Chimassorb 944) available from CIBA Specialty Chemicals Corporation.

The carbon black was Colonial 2447 concentrate, 50:50 carbon black and linear low density polyethylene, available from Colonial Rubber.

EXAMPLE 13

This example demonstrates the effect on mar resistance under accelerated aging conditions when a polysiloxane lubricant is present in the composition. The polymers, antioxidant, stabilizers, and carbon black are the same as those used in Example 12, and are used in the same amounts. The lubricants are the same as those used in Example 12.

Black test panels were prepared as described previously and were washed by hand approximately 30 seconds with tap water having a temperature of ~23° C., and 3–5 g of Ivory dishwashing detergent. The panels were then dried and tested with the Ford scratch apparatus described previously. The results are given in Table 2.

TABLE 2

| Sample | Control | 1 | 2 | 3 | 4 | 5 | 6 | 7 |
|---|---|---|---|---|---|---|---|---|
| Lubricant 1 | | | | 2 | 2 | | 2 | 2 |
| Lubricant 2 | | 0.2 | 0.2 | 0.2 | | | | 0.2 |
| Lubricant 3 | | | 0.2 | 0.2 | | 0.2 | 0.2 | |
| Scratch Rating N | | | | | | | | |
| Before Washing | 0.6 | N/M | N/M | N/M | 6.0 | N/M | N/M | 6.0 |
| After Washing | 0.6 | 0.6 | 2.0 | N/M | 6.0 | 0.6 | 2.0 | 6.0 |

The data show that test panels made from compositions of this invention that contained polysiloxane lubricants had better mar resistance under accelerated aging conditions than the same compositions that did not contain a polysiloxane.

EXAMPLE 14

This example illustrates the improvement in scratch and mar resistance and gloss when a combination of lubricants and sodium benzoate nucleating agent is added to a composition comprising a propylene homopolymer and an ethylene copolymer elastomer made with a metallocene catalyst.

The components listed in Table 3 (parts by weight) were mixed and formed into test specimens as described in Examples and Comparative Examples 1–12. The lubricants and antioxidant were the same as in Examples and Comparative Examples 1–12. The carbon black was Southwest 2500, a concentrate in linear low density polyethylene, commercially available from Southwest Chemicals.

Polymer G was a broad molecular weight distribution propylene homopolymer having a MFR of 3.8 dg/min, a molecular weight distribution ($M_w/M_n$) of 13.9, and xylene insolubles of 98.4%.

Polymer H was Engage 8180 ethylene/octene copolymer elastomer containing 28% octene, commercially available from DuPont Dow Elastomers.

TABLE 3

| Sample | Control | 1 | 2 | 3 | 4 |
|---|---|---|---|---|---|
| Polymer G | 70 | 80 | 70 | 60 | 50 |
| Polymer H | 30 | 20 | 30 | 40 | 50 |
| Lubricant 1 | — | 2 | 2 | 2 | 2 |
| Lubricant 2 | — | 0.2 | 0.2 | 0.2 | 0.2 |
| Lubricant 3 | — | 0.2 | 0.2 | 0.2 | 0.2 |
| Na Benzoate | — | 0.3 | 0.3 | 0.3 | 0.3 |
| Antioxidant | 0.2 | 0.2 | 0.2 | 0.2 | 0.2 |
| Carbon black | 4 | 4 | 4 | 4 | 4 |

TABLE 3-continued

| Sample | Control | 1 | 2 | 3 | 4 |
|---|---|---|---|---|---|
| Properties | | | | | |
| MFR dg/min | 8.2 | 9.4 | 7.3 | 6.5 | 5.3 |
| Specific gravity g/cc | 0.9 | 0.9 | 0.9 | 0.91 | 0.9 |
| Flexural modulus, kpsi .05 in/min, tangent | ~140 | 196 | 150 | 111 | 85 |
| Ford scratch test, N | 0.6 | 6 | 6 | 6 | 6 |
| Gloss, 60° | 85.8 | 85.3 | 85.2 | 85.0 | 85.4 |

Other features, advantages and embodiments of the invention disclosed herein will be readily apparent to those exercising ordinary skill after reading the foregoing disclosures. In this regard, while specific embodiments of the invention have been described in considerable detail, variations and modifications of these embodiments can be effected without departing from the spirit and scope of the invention as described and claimed.

We claim:

1. A composition comprising, by weight,
   (A) about 10 to about 90 parts of a propylene polymer material selected from the group consisting of (1) a crystalline propylene homopolymer, (2) a crystalline random copolymer of propylene and ethylene or a 4–8 C α-olefin, provided that when the olefin is ethylene, the maximum polymerized ethylene content is about 10%, and when the olefin is a 4–8 C α-olefin, the maximum polymerized content thereof is about 20%, and (3) a crystalline random terpolymer of propylene and two different α-olefins selected from the group consisting of ethylene and 4–8 C α-olefins, provided that the maximum polymerized 4–8 C α-olefin content is about 20%, and when ethylene is one of the olefins, the maximum polymerized ethylene content is about 5%,
   (B) about 90 to about 10 parts of an olefin polymer composition prepared by sequential polymerization in two or more stages in the presence of a titanium-containing Ziegler-Natta catalyst, the composition consisting essentially of:
      (1) about 25% to about 50% of a crystalline propylene homopolymer with a solubility in xylene at room temperature of less than or equal to 4%, or a crystalline random copolymer of propylene with ethylene or a 4–8 C α-olefin having an ethylene or α-olefin content of about 0.5% to about 3%, and a solubility in xylene at room temperature of less than or equal to 8%, and
      (2) about 50% to about 75% of an amorphous copolymer of ethylene selected from the group consisting of
         (a) a copolymer of ethylene and a 4–8 C α-olefin where the α-olefin content is about 10% to about 20% and the solubility in xylene at room temperature is about 10% to about 40%,
         (b) a copolymer of ethylene and a 3–8 C α-olefin wherein the α-olefin content is about 20% to about 60% and the solubility in xylene at room temperature is about 10% to about 95%, and
         (c) mixtures thereof,
      wherein the intrinsic viscosity of the xylene soluble portion of (B)(2) is equal to or less than 2.5; and
      wherein (A) plus (B) equals 100 parts, and
   (C) about 0.1 to about 10 parts of an additive to improve surface gloss and mar resistance selected from the group consisting of (1) a polysiloxane, (2) at least one saturated fatty acid amide, and (3) a combination of (1) and (2), per hundred parts of (A) plus (B).

2. The composition of claim 1 wherein the propylene polymer material in (A) is a crystalline propylene homopolymer.

3. The composition of claim 1 wherein (B)(1) is a crystalline propylene homopolymer.

4. The composition of claim 1 wherein (B)(2) is an ethylene/1-butene copolymer.

5. The composition of claim 1 wherein (B)(2) is an ethylene/propylene copolymer.

6. A molded article comprising the composition of claim 1.

7. A molded article comprising the composition of claim 2.

8. A molded article comprising the composition of claim 3.

9. A molded article comprising the composition of claim 4.

10. A molded article comprising the composition of claim 5.

* * * * *